Figure 1:
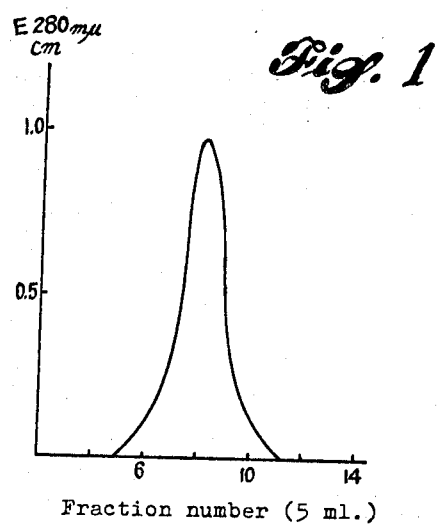

United States Patent [19]

Sugiura et al.

[11] 3,708,576
[45] Jan. 2, 1973

[54] NOVEL ANTI-INFLAMMATORY SUBSTANCES AND PRODUCTION THEREOF

[75] Inventors: Mamoru Sugiura, Konan; Kunio Kano, Ibaraki; Kazuaki Kimura, Yao; Hiroyuki Oono, Nishinomiya, all of Japan

[73] Assignee: ONO Pharmaceutical Co., Ltd., Osaka, Japan

[22] Filed: May 8, 1970

[21] Appl. No.: 35,756

[30] Foreign Application Priority Data

May 9, 1969 Japan ..................... 44/35877

[52] U.S. Cl. .................................. 424/115, 195/96
[51] Int. Cl. ............................................ A61k 21/00
[58] Field of Search ..... 195/96, 62, 31 P, 51 A, 51 E; 424/115

[56] References Cited

UNITED STATES PATENTS

| | | | |
|---|---|---|---|
| 3,031,380 | 4/1962 | Minagawa et al. | 195/96 |
| 2,895,882 | 7/1959 | Thorne et al. | 195/96 |
| 3,394,052 | 7/1968 | O'Connor et al. | 195/96 |
| 2,850,427 | 9/1958 | Alderton et al. | 195/96 |
| 2,386,994 | 10/1945 | Waldie | 195/31 P |
| 3,037,915 | 6/1962 | Takeda et al. | 195/51 A |
| 3,431,175 | 3/1969 | Arima et al. | 195/62 |

*Primary Examiner*—Alvin E. Tanenholtz
*Attorney*—Wenderoth, Lind & Ponack

[57] ABSTRACT

Novel anti-inflammatory substances are provided by culturing a microorganism such as *Aerobacter cloacae*, *Aerobacter aerogenes*, *Bacillus subtilis*, *Micrococus lysodeikticus* or *Pseudomonas aeruginosa* in a nutrient medium and recovering the novel substance from the fermentation broth.

5 Claims, 2 Drawing Figures

MAMORU SUGIURA,
KUNIO KANO,
KAZUAKI KIMURA and
HIROYUKI OONO,
INVENTORS

NOVEL ANTI-INFLAMMATORY SUBSTANCES AND PRODUCTION THEREOF

This invention relates to novel anti-inflammatory substances and production thereof.

There are known various anti-inflammatory agents. Roughly, they are classified into steroidal anti-inflammatory agents such as cortisone, dexamethasone, etc. and non-sterodal anti-inflammatory agents such as salicylates, pyrazolone type drugs and indomethacin. Recently, anti-inflammatory enzymatic preparations have come to be well known and actually used. However, the particulars of the pharmacological working mechanism of anti-inflammatory drugs are unknown and accordingly there appears to be a limitless possibility of newly discovering substances having an anti-inflammatory activity.

On the other hand, researches on utilizing metabolites of microorganisms including antibiotic substances for medicines have come to be worldwidely active. We also have made extensive researches and have now found that a substance having a strong anti-inflammatory activity is present in a fermentation broth resulting from the fermentation of a microorganism to be explained hereinafter. Such antiinflammatory substance is water-soluble, resistant to heat, acids and alkalis and has not yet been discovered to exist not only in microorganisms but also higher plants and higher animals.

According to the present invention, a microorganism belonging to *Aerobacter cloacae*, *Aerobacter aerogenes*, *Bacillus subtilis*, *Micrococus lysodeikticus* and *Pseudomonas aeruginosa* is fermented in a usual nutrient medium containing carbon source, nitrogen source and inorganic salts and a high molecular anti-inflammatory substance is recovered from the fermentation broth.

Figure 2:
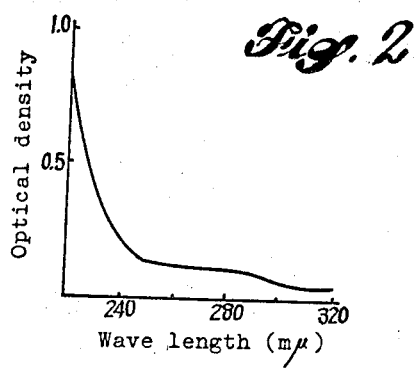

The invention will be explained in more detail in the following, partly by referring to the accompanying drawings wherein:

FIG. 1 is a graph showing a pattern of gel-filtration of an anti-inflammatory substance of this invention on a Sephadex G–200 column; and FIG. 2 is a graph showing an ultra-violet absorption spectrum of the anti-inflammatory substance of this invention.

In carrying out the present invention any microorganism belonging to *Aerobacter cloacae*, *Aerobacter aerogenes*, *Bacillus subtilis*, *Micrococus lysodeikticus* and *Pseudomonas aeruginosa* may be used. However, it is preferable to employ those belonging to the genus Aerobacter because they are higher in the productivity of the desired anti-inflammatory substance than others.

The above microorganisms have been completely described in the literatures and are well known in the art and are readily available from public cultures, and therefore no further explanation thereabout will be necessary.

According to the invention, such microorganism is fermented in a culture medium. The medium may be composed of usual nutrient ingredients conventionally used for the fermentation of the above mentioned microorganisms. Thus, the medium contains carbon sources, nitrogen sources and inorganic salts. More particularly, usual bouillon medium and other synthetic medium (e.g. peptone, sucrose, asparagin medium) may be used.

The fermentation may be carried out in a conventional manner under aeration. Any of the conventional submerged culture with stirring, shaking culture and stationary culture may be employed.

In any case the cultivation or fermentation may be carried out at a temperature of about 30°C. to 40°C., preferably at about 35° – 37°C.

Upon the growth of the microorganism there is produced an anti-inflammatory substance, which is accumulated in the culture medium. The accumulation attains maximum usually after about 16 – 24 hours fermentation.

The anti-inflammatory substance accumulated in the culture or fermentation broth may be isolated and purified in various manners as explained below.

METHOD I

After the cultivation of the microorganism the resulting fermentation broth is subjected to a centrifugal separation into a supernatant liquid and cells. The supernatant liquid is concentrated, for example, to about 1/20 at an external temperature of about 40° C. by a rotary evaporator and is heated to be sterilized, for example, at 100° C. for about 20 minutes. After cooling, the liquid is centrifuged to remove the insoluble material, and is then transferred to a dialyzing membrane and is dialyzed with running water for 2 to 3 days to remove low molecular weight substances. Then the liquid is again centrifuged to remove any insoluble material and is concentrated to a proper volume in the same manner as is mentioned above. The concentrate, after or without acetonefractioning, is gel-filtered with a filter such as Sephadex G–100. The anti-inflammatory substance comes only in the fraction at the forward end. The active fraction is further gel-filtered with Sephadex G–200. In this case, too, the fraction at the forward end has an activity and is of a substantially colorless solution. This solution is lyophilized or is dehydrated by adding acetone. There is obtained a purified powder of the anti-inflammatory substance.

The anti-inflammatory substance may also be recovered from the cells. In the case of handling a small amount of cells, the extraction can be conducted by grinding the cells with a siliceous glass powder in a mortar. But, for treating a large amount of cells, the following methods may be used:

1. Utilization of osmotic pressure.

In this method, washed cells are suspended in a small amount of water and the suspension is put into a $3M \cdot K_2PO_4$ solution. The whole is left overnight in a low temperature room and is then put into a large amount of water. Then the suspension is concentrated by a rotary evaporator and is centrifuged to obtain a supernatant liquid, which is used as a partially purified material.

2. Freezing and thawing method.

In this method, washed cells are suspended in a small amount of water. The suspension is put into a stocker below −20°C., and is left frozen longer than overnight. The frozen product is then fused in warm water. This operation is repeated two or three times. Then the suspension is centrifuge. and the supernatant liquid is used as a partially purified material.

In each case, the partially purified material is concentrated and is heated, for example, at 100°C. for 20 minutes to remove protein and nucleic acid by precipitation. The heated solution is cooled and then centrifuged and the supernatant liquid is dialyzed with water. The subsequent purification is carried out in the same manner explained before in respect of the culture filtrate solution.

METHOD II

The fermentation broth is adjusted to a pH of 3 to 4 with an acid (e.g. 3N HCl) and is separated into a supernatant liquid and cells by centrifugation. The supernatant liquid is cooled to 4° to 5°C., and potassium chloride is added thereto so as to be of a concentration of 1 – 5 percent, preferably about 3 percent. Then ethanol is added so that the final alcohol concentration may be 40 – 80 percent, preferably about 50 percent. The solution is left at 4° to 5° C. overnight. Then the greater part of the supernatant liquid is removed by decantation and the precipitate is collected by centrifugation. The precipitate is dissolved in water and is again ethanol-precipitated in the same manner as in the first ethanol-precipitation in the presence of potassium chloride. The precipitate is dialyzed with water and then the inner liquid of the dialysis is lyophilized to obtain an anti-inflammatory substance.

The properties of the thus obtained anti-inflammatory substances are not so different depending on the kind of the bacteria used for the initial cultivation.

Thus the purified anti-inflammatory substances obtained by this invention are tasteless, odorless, colorless, water-soluble and neutral. They are insoluble in such ordinary solvent as methanol, ethanol, acetone, benzene, ether, etc. According to investigation by means of a gel-filtration (e.g. on Sephadex G–200, Bio-Gel P–300, etc.) the molecular weight is presumed to be more than 200,000 (FIG. 1). The ammoniac nitrogen as determined by the micro Kjeldahl method is about 5 percent. The ultraviolet absorption spectrum (FIG. 2) shows an absorption only at short waves but has no maximum absorption at 280 and 260 m$\mu$ peculiar respectively to protein and nucleic acid. As regards the color reactions, the Molish reaction which is a general color reaction of saccharides is positive. The ninhydrin reaction which is a color reaction of an amino group and also the biuret reaction which is a reaction of a peptide bond are positive. But the xanthoprotein reaction which is a reaction of protein is negative. The rhodamine stain which is a lipid detecting method is negative with direct stain but is positive for chloroform-methanol-extracted one. The specific rotation is $[\alpha]_D^{26.5} + 45°$ (C = 1, water). The phosphors content is about 0.22 percent. Further, this substance is nondialyzable and is stable at 100° C. for 10 minutes and also stable at a pH of 4 to 10. Even by the treatment with such enzyme as protease or amylase, the anti-inflammatory activity is not reduced.

The anti-inflammatory activity of this substance is illustrated in Table 1 by taking a sample obtained by the use of Aerobacter cloacae (AHU 1342) as the microorganism.

The anti-inflammatory activity was determined according to Martin's leg edema method on rats. Thus, male Wister rats each weighing 100 to 150 g. were used and one group consisted of five rats. In the control, too, a group of five rats was used. The test sample was dissolved in a physiological saline solution to be of a concentration of 10 ml./kg. and the resulting solution was administered. In 30 minutes after the administration of the test sample, 0.1 ml. of 0.5 percent carrageenin was subcutaneously injected into the left hind leg and 0.1 ml. of a physiological saline solution was subcutaneously injected into the right hind leg. Every hour in 2 to 6 hours after the injection of carrageenin, the antiinflammatory inflammatory effect was investigated by measuring the volume of the edema.

It will be seen from Table 1 that not only the usual administration but also the duodenum administration is effective.

The toxicity (rats) was $LD_{50}$ 750 $\gamma$/kg. in the case of intravenous injection, 1 mg./kg. in the case of intraperitoreal injection and 3.1 mg/kg. in the case of intramuscular injection.

TABLE 1

| Route | Dose (mg./kg.) | Rate (%) of inhibition of edema | | | | |
|---|---|---|---|---|---|---|
| | | 2 hrs. | 3 hrs. | 4 hrs. | 5 hrs. | 6 hrs. |
| Intravenous injecttion | 0.0025 | 62 | 70 | 78 | 56 | 56 |
| Intra-peritoneal injection | 0.020 | 84 | 72 | 66 | 42 | 22 |
| Intra-muscular injection | 0.025 | 54 | 58 | 64 | 56 | 53 |
| Subcutaneous injection | 0.100 | 53 | 52 | 53 | 49 | 46 |
| Duodenum administration | 25 | 75 | 57 | 52 | 32 | 15 |

There has been no nonsteroidal anti-inflammatory drug which is so stable, has an anti-inflammatory effect with a slight dosage and has a possibility of being used by injection. Further, the anti-inflammatory substance of this invention can be mass-produced with a favorable reproductivity.

The invention will be illustrated by the following Examples.

EXAMPLE 1

2 liters of a seed prepared by the precultivation of a strain of Aerobacter cloacae (AHU 1342) were inoculated into 100 liters of a culture medium consisting of 1 percent peptone and tap water. After the inoculation, the cultivation was conducted under aeration and at 37°C. for 16 hours. After the cultivation, the cells were removed by centrifugation. The filtrate was added with potassium chloride so as to be 3 percent. Then ethanol was added thereto under cooling in such amount that the final concentration of alcohol is 50 percent. The solution was left overnight.

In the observation of the precipitation of the anti-inflammatory substance depending upon the concentration of the added potassium chloride, it was found that, the precipitate remained floating and did not settle on the bottom until potassium chloride is added to be 2 percent. However the 2 percent concentration is not sufficient to satisfactorily settle the precipitate. When potassium chloride is added so as to be a concentration of 3 to 5 %, the precipitate settle almost perfectly so that the decantation could be easily conducted.

The produced white precipitate was collected by decantation, was dialyzed with water to remove ethanol and was lyophilized. The yield was 64 g. The anti-inflammatory effect of this sample is shown in Table 2.

EXAMPLE 2

The same procedure as Example 1 was repeated except that a strain of Aerobacter aerogenes (IFO 3166) was used. There were obtained 7.0 g. of a lyophilized product. The anti-inflammatory effect of this sample is shown in Table 2.

EXAMPLE 3

The procedure of Example 1 was repeated except that a strain of Bascillus subtilis (NRRL 558) was used. There were obtained 5.8 g. of a lyophilized product. The anti-inflammatory effect of this sample is shown in Table 2.

EXAMPLE 4

The procedure of Example 1 was repeated except that a strain of Micrococus lysodeikticus (IFO 3333) was used. There were obtained 4.8 g. of lyophilized product. The anti-inflammatory effect of this sample is shown in Table 2.

EXAMPLE 5

The procedure of Example 1 was repeated except that a strain of Pseudomonas aeruginosa (IFO 3448) was used. There were obtained 8.1 g. of a lyophilized product. The anti-inflammatory effect of this sample is shown in Table 2.

Table 2*

| Test sample | Route | Dose (mg./kg.) | Rate (%) of inhibition of edema | | | | |
|---|---|---|---|---|---|---|---|
| | | | 2 hrs. | 3 hrs. | 4 hrs | 5 hrs. | 6 hrs. |
| Ex. 1 | Intra-peritoneal injection | 0.01 | 71 | 63 | 43 | 33 | 25 |
| Ex. 2 | " | 0.10 | 51 | 45 | 43 | 32 | 22 |
| Ex. 3 | " | 0.20 | 73 | 62 | 58 | 51 | 43 |
| Ex. 4 | " | 0.20 | 57 | 51 | 53 | 37 | 24 |
| Ex. 5 | " | 0.050 | 52 | 56 | 51 | 45 | 38 | data observed in relation to tests conducted on rats

EXAMPLE 6

A strain of Aerobacter cloacae (AHU 1342) was inoculated into a culture medium consisting of 1 g. of meat extract, 1 g. of peptone, 0.3 g. of sodium chloride and 100 ml. of tap water (adjusted to pH 7.0) in a shaking flask of a capacity of 500 ml. and was shaken for cultivation at 37°C. for about 20 hours. This resulting broth was centrifuged at 10,000 r.p.m. for 10 minutes to be separated into cells and a supernatant liquid. The transparent supernatant liquid was concentrated to about 1/20 by using a rotary evaporator. This concentrate was heated in boiling water on an oil bath for about 20 minutes. The produced precipitate was removed by centrifugation. The supernatant liquid was transferred to a cellophane tube and was dialyzed with running water. The dialyzed inner liquid was centrifuged to remove the insoluble material, was then concentrated and was gel-filtered with Sephadex G-100 equilibrated with water. The elution was conducted with water. The fraction was traced with an ultra-violet absorption ninhydrin coloring and Molish reaction. The anti-inflammatory substance was eluted out into a fraction which passed through Sephadex G-100. The anti-inflammatory substance was collected and was lyophilized or was dehydrated by adding acetone, to obtain a purified product. The yield from one liter of the initial fermentation broth was 230 mg.

The anti-inflammatory activity of this substance is as shown in Table 3.

TABLE 3

| Route | Dose (mg./kg.) | Rate (%) of inhibition of edema | | | | |
|---|---|---|---|---|---|---|
| | | 2 hrs. | 3 hrs. | 4 hrs. | 5 hrs. | 6 hrs. |
| Intravenous injection | 0.3 | 87 | 88 | 89 | 82 | 74 |
| " | 0.1 | 79 | 74 | 72 | 68 | 56 |
| " | 0.03 | 42 | 36 | 35 | 10 | 0 |
| Intra-peritoreal injection | 0.3 | 83 | 86 | 88 | 79 | 72 |
| Intra-muscular injection | 1.0 | 56 | 57 | 58 | 62 | 65 |
| Subcutaneous injection | 1.0 | 21 | 28 | 25 | 36 | 56 |

In the case of the intravenous administration in rats, $ED_{50}$ was about 50 $\alpha$/kg. and $LD_{50}$ was about 7.5 mg./kg.

EXAMPLE 7

14.5 g. (wet weight) of the cells obtained from 1 liter of the fermentation broth of Example 6 were washed with water and suspended in 150 ml. of water. The suspension was frozen in a stock at −20°C. and was left overnight to be fused and again put into the stocker and the same operation was repeated. This solution was centrifuged at 20,000 r.p.m. for 20 minutes and then the supernatant liquid was heat-treated. Then, by the same method as in Example 1, the anti-inflammatory substance was separated and purified to obtain 158 mg. of purified product.

EXAMPLE 8

14.5 g. (wet weight) of the cells same as in Example 7 were washed with water and suspended in 100 ml. of a 3M·$K_2HPO_4$ solution. The suspension was left overnight in a low temperature room and was gradually poured into 20 liters of water while stirring. Then this aqueous solution was concentrated to about 100 ml. with a rotary evaporator and was centrifuged at 20,000 r.p.m. for 20 minutes to remove the destroyed cells. The supernatant liquid was dialyzed with water. Then, by the same method as in Example 1, separation and purification was conducted to obtain 180 mg. of an anti-inflammatory substance.

EXAMPLE 9

Aerobacter cloacae (AHU 1342) was inoculated into a culture medium consisting of 0.5 g. of peptone, 0.5 g. of $KH_2PO_4$, 0.2 g. of $MgSO_4·7H_2O$ and 100 ml. of tap water (adjusted to pH 7.0) in a shaking flask of a capacity of 500 ml., was shaken for cultivation at 37°C. for about 20 hours. The resulting fermentation broth was treated in the same manner as in Example 1 to obtain 350 mg. of an anti-inflammatory substance from 1 liter of the original fermentation broth.

What we claim is:

1. An anti-inflammatory substance obtained from a fermentation broth resulting from the cultivation of a strain belonging to *Aerobacter cloacae, Aerobacter aerogenes, Bacillus subtilis, Micrococus lysodeikticus* or *Pseudomonas aeruginosa*, and having the following properties:

a. tasteless, odorless and colorless,
   b. water soluble,
   c. neutral,
   d. molecular weight greater than 200,000,
   e. ammoniac nitrogen content of about 5 percent,
   f. ultraviolet absorption spectrum showing absorption only at short waves, with no maximum absorption at 280 and 260 m$\mu$,
   g. positive Molish reaction,
   h. positive ninhydrin reaction,
   i. positive biuret reaction,
   j. negative xanthoprotein reaction,
   k. negative rhodamine stain with direct stain, but positive rhodamine stain for chloroform-methanol-extracted stain,
   l. specific rotation of $[\alpha]_D^{26.5} + 45°$ ($c=1$, water),
   m. phosphorous content of about 0.22 percent,
   n. not dialyzable, and
   o. stable at 100° C for 10 minutes and stable at pH 4–10.

2. A process for producing the high molecular weight anti-inflammatory substance of claim 1 cultivating a microorganism belonging to *Aerobacter cloacae, Aerobacter aerogenes, Bacillus subtilis, Micrococus lysodeikticus* or *Pseudomonas aeruginosa* in a nutrient medium containing a carbon source, nitrogen source and inorganic salts and recovering the high molecular weight anti-inflammatory substance from the resulting fermentation broth.

3. The process as claimed in claim 2 wherein the anti-inflammatory substance is precipitated from a filtrate of the fermentation broth by the addition of ethanol in the presence of potassium chloride.

4. The process as claimed in claim 2 wherein a filtrate of the fermentation broth is concentrated, dialyzed to remove low molecular weight substances, and subjected to gel-filtration to obtain a fraction containing the anti-inflammatory substance.

5. The process as claimed in claim 3 wherein potassium chloride is added to the filtrate in an amount such that the potassium chloride concentration is 1–5 percent and then ethanol is added thereto in an amount such that the alcohol concentration is 40–80 percent, thus precipitating the anti-inflammatory substance.

* * * * *